J. F. ANDERSON.
ADDING AND SUBTRACTING MACHINE.
APPLICATION FILED MAR. 13, 1916.
1,248,986.
Patented Dec. 4, 1917.
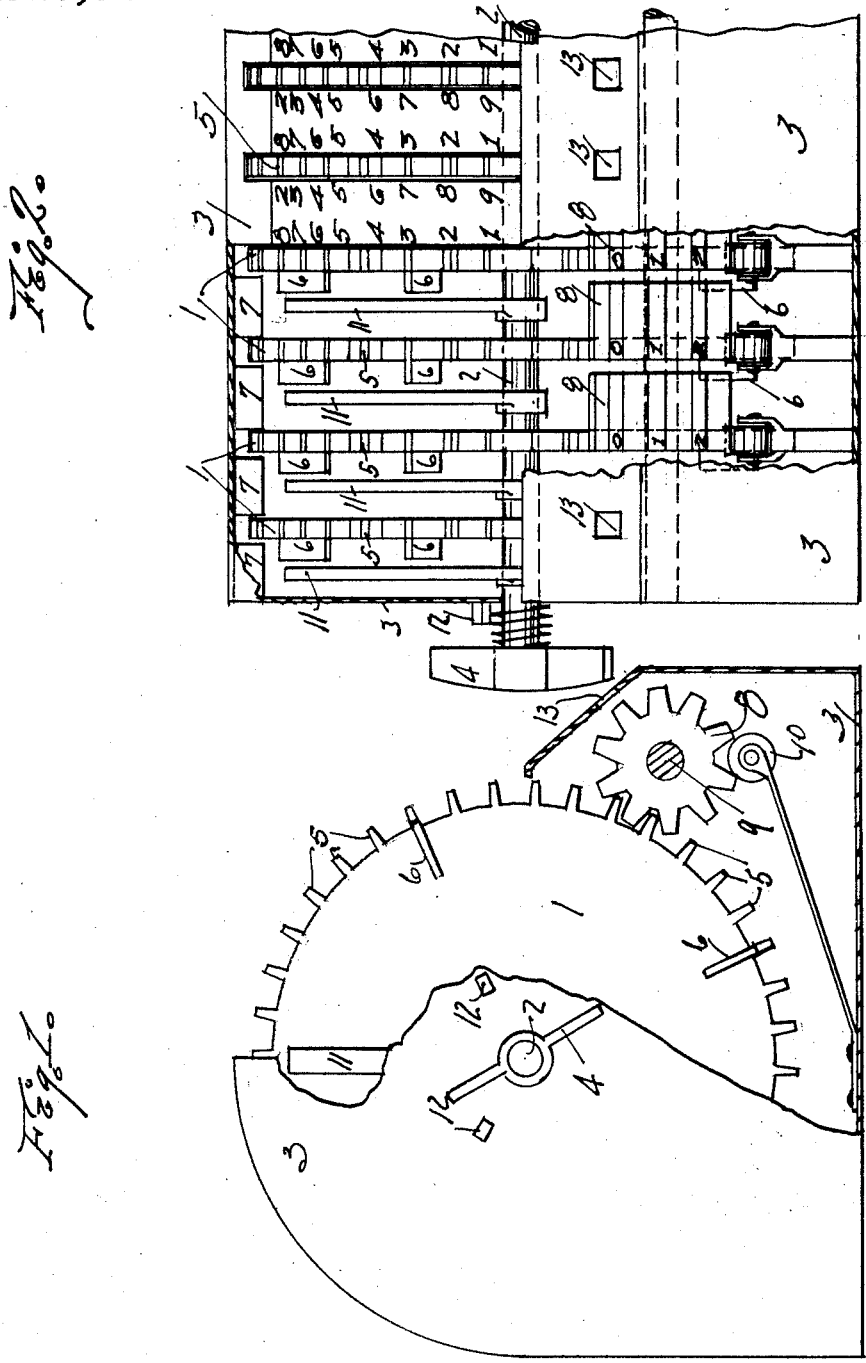
WITNESS
INVENTOR
John F. Anderson
BY
ATTORNEY

UNITED STATES PATENT OFFICE.

JOHN F. ANDERSON, OF SEATTLE, WASHINGTON.

ADDING AND SUBTRACTING MACHINE.

1,248,986.     Specification of Letters Patent.     Patented Dec. 4, 1917.

Application filed March 13, 1916. Serial No. 83,800.

*To all whom it may concern:*

Be it known that I, JOHN F. ANDERSON, a citizen of the United States, and a resident of Seattle, in the county of King and State of Washington, have invented certain new and useful Improvements in Adding and Subtracting Machines, of which the following is a full, true, and exact specification.

My invention relates to improvements in adding and subtracting machines and has for its principal object to provide an improved and simplified device of the character described; to provide a novel carrying mechanism; to provide a simple clearing mechanism.

Other objects will appear as my invention is more fully explained in the following specification, illustrated in the accompanying drawings and pointed out in the appended claim.

In the drawings, Figure 1 is an end elevation of my machine with parts broken away. Fig. 2 is a front elevation of same.

Referring more particularly to the drawings, numeral 1 indicates master wheels which are similar and are loosely mounted on a shaft 2. Shaft 2 is mounted in a housing 3 which incloses the master wheels 1. The shaft 2 is slidable with respect to the said wheels and housing and has a thumb nut 4 on one end. Master wheels 1 are provided with wide spaced teeth 5 which are arranged continuously in multiples of ten. Every tenth tooth has a wide lateral projection 6. Wheels 1 are held in alinement by spacers 7 which are secured to housing 3. A portion of the periphery of the master wheels extend through slots in the housing. Totaling wheels 8, each having ten teeth, engage the teeth 5 of wheels 1. The teeth of totaling wheels 8 are wide enough to engage the projectors 6 of the wheel 1 which lies to the right of the wheel with which the said totaling wheel is in mesh. When the projection 6 engages the totaling wheel, it revolves it a space equal to one tooth. The ends of the teeth of the totaling wheels are consecutively numbered from zero to nine. Totaling wheels 8 are loosely mounted on a shaft 9 and are retained against lateral movement by collars. Spring retaining pawls 10 prevent the wheels from accidental movement. The portions of the master wheels projecting from the housing, include nine teeth which rest opposite consecutive numbers from one to nine on the housing on either side of the master wheels. The members on one side reading from top to bottom and on the other side from bottom to top, the former for subtraction and the latter for addition. Clearing arms 11 are secured to shaft 2 and normally are just out of engagement with projectors 6. The arms 11 are brought into engagement with said projections by thrusting the shaft 2 to the right which moves the arms 11 laterally into the path of projections 6. The shaft 2 is then rotated alternately in opposite directions until the thumb nut 4 engages both lugs 12 on housing 3. The lugs 12 are spaced apart a distance equal to projections 6. Holes 13 in casing 3 expose one digit on each of totaling wheels 8. When using my machine for addition, of numbers, the master wheels 1 are numbered from right to left as units, tens, hundreds, etc. In adding 26 and 7, the unit master wheel is pulled downward six teeth, the tens wheel two spaces, and the units wheel seven spaces.

The above movements of the master wheel in the units and tens columns have advanced the corresponding totaling wheels to each read 3. During the addition, one of the projections 6 on the units wheel has advanced the tens totaling wheel one space. In subtraction, the master wheels are rotated upwardly instead of downwardly.

While I have shown a particular form of embodiment of my invention, I am aware that many minor changes therein will readily suggest themselves to others skilled in the art without departing from the spirit and scope of the invention and I therefore desire to avoid being limited to the exact form shown and described.

Having described my invention, what I claim as new and desire to protect by Letters Patent, is—

In an adding and subtracting machine, the combination of a frame provided on its outer sides with stops, a rotatable and slidable shaft mounted in the frame and provided on one end with a finger piece arranged to engage the stops when in one position, means for returning the shaft to normal position, gear wheels loosely mounted on the shaft and arranged to be reset when said shaft is rotated, lugs extending from the frame and projecting between the gear wheels and the frame and between adjacent gear wheels to retain the latter in position on the shaft, and adding wheels engaging said gear wheels.

JOHN F. ANDERSON.